June 29, 1926. 1,590,369

W. HAHNEMANN ET AL

DEVICE FOR PREVENTING UNDESIRED VIBRATIONS IN SOUND SIGNALING APPARATUS

Filed Feb. 4, 1921

Inventors
Walter Hahnemann
Heinrich Hecht
Ferdinand Schenkelberger and
Alard du Bois-Reymond by Knight Bros
attorneys Patented June 29, 1926.

1,590,369

UNITED STATES PATENT OFFICE.

WALTER HAHNEMANN, OF KITZEBERG, NEAR KIEL, HEINRICH HECHT, OF KIEL, AND FERDINAND SCHENKELBERGER AND ALARD du BOIS-REYMOND, OF PLON, NEAR KIEL, GERMANY, ASSIGNORS TO THE FIRM SIGNAL GESELLSCHAFT M. B. H., OF KIEL, GERMANY.

DEVICE FOR PREVENTING UNDESIRED VIBRATIONS IN SOUND SIGNALING APPARATUS.

Application filed February 4, 1921, Serial No. 442,587, and in Germany June 30, 1917.

(GRANTED UNDER THE PROVISIONS OF THE ACT OF MARCH 3, 1921, 41 STAT. L., 1313.)

This invention relates to sound signaling apparatus, in which a mechanical vibratory structure that operates to transfer sound vibrations is directly coupled with a radiating body or structure (diaphragm, skin or hull of a ship, or the like) or is composed of such a radiating body and other constructional elements.

In sound signaling apparatus of this kind the mechanical vibratory structures are generally capable of executing various forms of vibrations of very different frequencies and damping according to the direction in which they are excited or caused to oscillate. But in nearly all cases where these apparatus are employed, especially if it is a question of sending or receiving signals by sound waves, only one form of vibration is desired, while all other forms of vibration that occur are deleterious and a source of annoyance.

To illustrate how different forms of vibration occur in a vibratory body, we will imagine a vibrating rod of square cross-section fixed at one end to a radiating member. If the width of the rod is less than its length and the rod is struck in the direction of this length it will emit a higher note than if it were struck in the direction of the width. If, however, the blow is not delivered precisely in the one or the other of the two said directions, but at an angle, no matter how slightly, to one of them, the sound that the striker intended to produce, will always be accompanied by the second possible sound, which will be louder or fainter according to the degree of the said angle. Similar phenomena are observed in most commonly used sound giving bodies.

To prevent such multi-tone bodies or structures from executing undesired vibrations, friction cushions for damping the undesired vibrations have been proposed. But as all the vibrations of such multi-tone structures are, so to speak, acoustically coupled to each other in a more or less degree, such friction devices will always also effect the vibrations of the desired form, and by considerably damping them will lead to serious losses.

In accordance with the present invention undesired vibrations are prevented in sound signaling apparatus of the above-mentioned kind by employing holding or supporting members which, while substantially preventing the masses or bodies of the vibratory structures of the apparatus from moving in the direction of the undesired vibrations, subject these masses to the least possible amount of restraint in moving in the direction of the desired vibrations. Holding members that fall under this category are, for example, wire-strings, rods, diaphragms, etc.

A specially advantageous type of such vibratory structures is one in which special masses are connected to each other by elastic members in such a manner that when the vibratory structure is excited these masses execute movements towards and away from each other alternately, while alternately compressing and expanding the elastic member or members. In cases in which this kind of vibratory structure is used, the object of the invention will already be accomplished to a very great extent by connecting the vibrating masses of the structure to each other by means of elastic diaphragms. If the vibratory structure is attached to a sound-radiating diaphragm in such a manner that the connecting diaphragm extends parallel to the sound-radiating diaphragm, the masses of the vibratory structure will, when this latter is excited, oscillate in the direction perpendicular to the surface of the diaphragms, and any motion in the direction parallel to the diaphragms will be precluded.

Such connecting diaphragms may of course be substituted by other forms of connecting members such as rods, wire-strings, transverse stays, etc., but such members must also be so disposed that they lie in a plane that extends perpendicularly to the direction of the motion of the masses, and they will preferably extend radially from the masses.

In arrangements of this kind vibrations at an angle to the plane of the sound-radiating diaphragm will still be possible, so that all undesired vibrations will not be absolutely precluded.

In order to also prevent these angular vibrations from occurring, the second mass, that is not directly attached to the sound-radiating diaphragm and is not restrained in its movements by the same, is connected with another diaphragm, or with a set of members forming an equivalent of it, in such a manner, that a certain portion of its surface bears against the second diaphragm.

Constructural forms of the invention are shown in the drawing in which,

Fig. 1 shows a side sectional elevation of a sound signaling apparatus comprising a sound-radiating diaphragm, and a vibratory structure composed of bodies or masses connected by elastic rods, the vibratory structure having one of its masses attached to the sound radiating diaphragm, while its unrestrained mass is held against side-wise movement by rods extending parallel to the plane of the sound-radiating diaphragm.

In each of the four figures, 1 is the sound-radiating diaphragm abutting against the sound propagating medium, 2 is a mass directly attached to the said diaphragm, 3 a free mass connected to 2 by an elastic connecting member 4.

Figure 1:
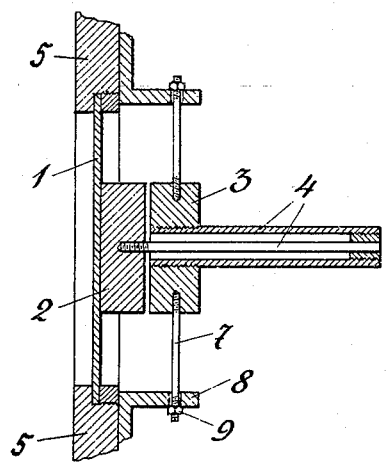

In Fig. 1 the sound signaling apparatus is represented as connected to the hull of a ship 5; while in the other figures the moving parts are enclosed in a casing 6, which latter is adapted to be freely suspended in any medium, such as water.

When an apparatus of any of the types shown is operated the vibratory structure 2, 3, 4 is excited in such a manner that the masses 2, 3 move in mutually opposite directions and perpendicularly to the surface of the radiating diaphragm. In the example shown in Fig. 1 the elastic rod and the tube surrounding it, which conjointly form the elastic connecting member between the two masses, would ordinarily offer very little resistance to undesired motions that the mass 3 may execute in a direction perpendicular to the length of the rod and tube. Once the moving members of the apparatus are excited in this direction, as by knocks against the wall of the ship, these members will carry out violent vibrations in the said direction, which will be the more disturbing because, as they give off very little energy through the diaphragm, their damping is extremely small.

These disturbing vibrations are prevented by the holding or supporting rods 7, 7 which extend radially from the mass 3 and terminate in posts 8 fixed to the ship's hull. These rods can be tightly tensioned by means of nuts 9. Lateral movements of 3 are only possible by elongations of the rods, so that considerable resistance is offered to such movements. But the resistance offered by the rods to the desired movements of the mass 3, which run perpendicular to the flat surface of this mass, is very small, because the rods are easily bent.

Figure 2:
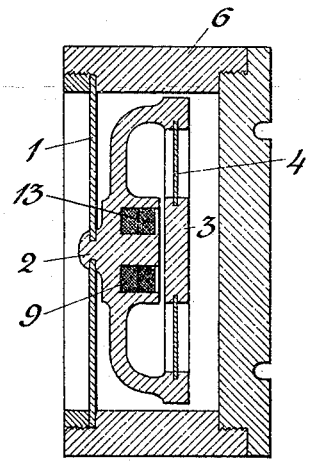
Fig. 2 illustrates an apparatus of a similar kind in which the rods connecting the masses are substituted by a diaphragm.

In the modification shown in Fig. 2 the place of the lateral holding rods for the mass 3 is taken by the diaphragm 4 that connects the masses 2, 3. It will be obvious that in this arrangement motions of the mass 3 in the direction parallel to the flat surface can hardly occur. In this device the mass is made in the shape of a basin-like body whose open end is closed by the diaphragm 4 and the mass 3. The middle part of the mass 2 is made in the form of a magnet, opposite to which is the mass 3, in the shape of an armature. The electromagnet is either excited by an alternating current that is sent through the coil 9, or, if the apparatus is to be used as a sound signal receiver, the coil is connected to a telephone receiver. In the latter case the electromagnet is polarized by a separate continuous current, which is sent through the coil 13.

Figure 3:
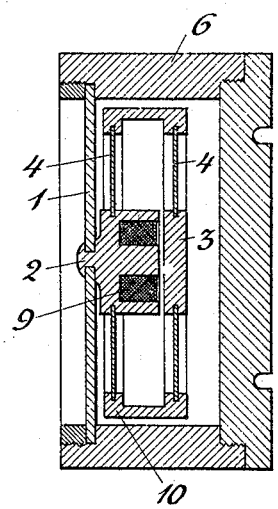
Fig. 3 is a side sectional elevation of a modification of the apparatus of Fig. 2 with two diaphragms or plates connecting the masses of the vibratory structure.

The device of Fig. 3 is constructed on the same lines, the chief difference being that the elastic connecting member between the masses 2 and 3 consists of two diaphragms fixed in a ring 10. The mode of operation is the same as that of the arrangement shown in Fig. 2.

Figure 4:
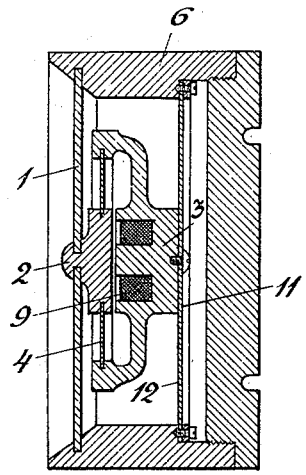
Fig. 4 is another modified apparatus with a mass-connecting diaphragm and a special supporting diaphragm for the unrestrained mass.

In the arrangement shown in Fig. 4 the positions of the masses shown in Fig. 2 are reversed, the armature 2 of the vibratory structure 2, 3, 4 being attached to the sound radiating diaphragm while the body of the electromagnet is arranged to act as an unrestrained mass. In this device the diaphragm 4 which connects 2 and 3 extends outwards from the mass 2, and the basin-shaped mass 3 is turned in the opposite direction and is joined to the periphery of the diaphragm 4. By causing the comparatively large mass 3 to be supported at the periphery of the diaphragm 4, the danger is incurred of the diaphragm 4 being bent at its upper and lower portions to opposite sides of a line drawn parallel to the diaphragm and through the middle of the mass 2. To prevent this from happening, another diaphragm 11 is provided a large part of whose surface bears against the mass 3. (The danger of the occurrence of concomitant vibrations similar to those just described also exists in apparatus according to Figs. 2 and 3, although in a lesser degree; so a special supporting diaphragm may be advantageously used in such apparatus also.) In other respects the mode of operation of the apparatus of Fig. 4 is exactly the same as that of the arrangements illustrated in Figs. 2 and 3.

A special advantage of the arrangements shown in Figs. 2 to 4 is that the vibratory structure 2, 3, 4 and hence the whole apparatus, can be built flat and got into a very small compass. The apparatus of Fig. 2 offers special advantages as a device for operation under water (or liquids) inasmuch as its armature 3, which is made to form the smaller mass of the vibratory structure, acts at the middle of a diaphragm (4); i. e. at the point of the latter that executes the largest amplitudes, while on the other hand the periphery of the diaphragm, which is a part that carries out small movements, is connected (through the practically inflexible mass 2) to the sound-radiating diaphragm at point of largest amplitude of the latter, i. e. the centre. The advantage obtained by this is that the armature of the electromagnet will be caused to execute movements of a considerable magnitude (which is necessary for a high efficiency) when the radiating diaphragm affects the vibratory structure 2, 3, 4 by motions of small amplitude but considerable force.

An inspection of the figures will reveal the fact that the holding members might also act as vibratory bodies or structures, as for example the rods 7, 7 of Fig. 1. A feature of the invention is that in such cases the particular dimension of the holding member that is practically unyielding to any stresses that might occur is to be turned into the direction of the amplitude of motion of the vibration that is to be prevented. Strictly speaking such bodies or structures, such as rods and the like, are also capable of vibrating longitudinally, i. e. in the direction in which they are here assumed to be practically unyielding; but the pitch of these vibrations is so high and their amplitudes are so small in comparison with the amplitudes of motion of the vibrations to be suppressed, that they suppress the undesired vibrations to a satisfactory extent.

On the other hand the holding members generally also exert elastic forces in the direction of the amplitude of motion of the desired vibrations. In accordance with the invention provision has to be made for reducing the forces acting in this direction to the utmost. In any case these forces must be made so small that the frequency of the natural vibrations of the holding member in this direction is far below the frequency of the desired vibrations executed by vibratory members that operate to produce or receive sound waves.

The points to be observed in cases in which the holding members themselves form vibratory bodies or structures that are free to vibrate in various directions may be summarized as follows: The form selected for these members must be such that the vibrations that they are capable of performing in different directions lie very far apart (high and low) on the scale of frequencies, and that they are connected to the actual vibratory structures of the sound signaling apparatus in such a manner that the direction of their vibrations of a high frequency coincides with the direction of the vibration in the apparatus that it is desired to suppress, while their vibrations of a low frequency are executed in the same direction as the permissible vibrations of the moving parts of the apparatus.

It will never be possible to altogether prevent the holding members from affecting the tuning of the acoustic vibratory structures of the apparatus, and therefore the masses and elastic forces of these members must be taken into account in calculating the frequencies of the vibrations to be executed by the apparatus.

We claim:

1. In sound signaling apparatus, a diaphragm, a vibratory structure connected with said diaphragm and capable of executing desired free vibrations in a certain direction, and a holding member for substantially preventing undesired vibrations in other directions, the holding member being substantially rigid in the direction of the undesired vibrations and yielding in the direction of the desired vibrations.

2. In sound signaling apparatus, a diaphragm, a vibratory structure connected with said diaphragm and capable of executing desired free vibrations in a certain direction, and a support for substantially preventing undesired vibrations in other directions, said support having a frequency greater than that of the undesired vibrations in the direction of the undesired vibrations and lower than that of the desired vibrations in the direction of the desired vibrations.

3. In a sound signaling apparatus, a vibratory structure capable of executing desired vibrations in a certain direction, and a holding member for substantially preventing undesired vibrations in another direction, the form of the holding member being such as to enable it to execute vibrations of different frequencies in different directions and that its various natural rates of vibration differ widely from each other, the direction of its high frequency vibrations coinciding with the direction of the undesired vibrations of the said structure and the direction of its vibrations of lower frequency being the same as the direction of the desired vibrations of said vibratory structure.

4. In a sound signaling apparatus; a sound radiating member; a vibratory structure comprising separate masses and an elastic member connecting these masses, one of the said masses being attached to the said radiating member, and means for substantially preventing movements of the second said mass in a direction perpendicular to the direction of the vibrations of the radiating member.

5. In a sound signaling apparatus, a sound radiating member; a vibratory structure comprising separate masses and an elastic member connecting these masses, one of the said masses being attached to the said radiating member, and means for substantially preventing any movements of the said masses except movements in the direction of vibration of the radiating member.

6. In a sound signaling apparatus, a sound radiating diaphragm; and a vibratory structure comprising two masses and a diaphragm connecting the two masses, the last-named diaphragm extending substantially parallel to the radiating diaphragm, and one of the said masses being attached to the radiating diaphragm.

7. In a sound signaling apparatus, a sound radiating diaphragm; and a vibratory structure comprising two masses and a diaphragm connecting the two masses, the last-named diaphragm extending parallel to the radiating diaphragm, and one of the said masses being attached to the radiating diaphragm, this mass being basin-shaped and attached to the periphery of said connecting diaphragm, and the other mass being attached to the middle of the connecting diaphragm.

8. In a sound signaling apparatus, a sound radiating diaphragm; and a vibratory structure comprising two masses and a diaphragm connecting the two masses, the last-named diaphragm extending parallel to the radiating diaphragm, and one of the said masses being attached to the radiating diaphragm, this mass being heavier than the second mass and basin-shaped, and attached to the periphery of the connecting diaphragm, the middle portion of the basin-shaped mass comprising an electromagnet, and the said second mass being attached to the middle of the connecting diaphragm and forming an armature of the said electromagnet.

9. In a sound signaling apparatus, a sound radiating diaphragm; and a vibratory structure comprising an electromagnet and an armature adapted to function also as vibrating masses, and an elastic connecting diaphragm extending parallel to the radiating diaphragm and connecting the electromagnet and its armature to each other; one of the masses of the vibratory structure being attached to the radiating diaphragm.

In testimony whereof we affix our signatures.

WALTER HAHNEMANN.
FERDINAND SCHENKELBERGER.
ALARD du BOIS-REYMOND.
HEINRICH HECHT.